United States Patent [19]

Garg et al.

[11] Patent Number: 5,348,592
[45] Date of Patent: Sep. 20, 1994

[54] METHOD OF PRODUCING NITROGEN-HYDROGEN ATMOSPHERES FOR METALS PROCESSING

[75] Inventors: Diwakar Garg, Macungie; Brian B. Bonner, Nesquehoning; Paul T. Kilhefner, Wescosville; Paul A. Mattiola; David L. Mitchell, both of Coopersburg, all of Pa.

[73] Assignee: Air Products and Chemicals, Inc., Allentown, Pa.

[21] Appl. No.: 12,065

[22] Filed: Feb. 1, 1993

[51] Int. Cl.$^5$ ............................ C21D 1/00; C21D 9/00
[52] U.S. Cl. .................................. 148/208; 148/206; 148/216; 148/218
[58] Field of Search ............. 148/206, 208, 216, 218

[56] References Cited

U.S. PATENT DOCUMENTS

| | | | |
|---|---|---|---|
| 3,535,074 | 10/1970 | Nakashima et al. | 23/2 |
| 4,713,224 | 12/1987 | Tamhankar et al. | 423/219 |
| 4,931,070 | 6/1990 | Prasad | 55/16 |
| 4,960,579 | 10/1990 | Campbell | 423/351 |
| 5,004,482 | 4/1991 | Hass et al. | 55/16 |
| 5,004,489 | 4/1991 | Rotman et al. | 65/32.2 |
| 5,045,126 | 9/1991 | Comier et al. | 148/218 |
| 5,057,164 | 10/1991 | Nilsson et al. | 148/16 |
| 5,069,728 | 12/1991 | Rancon et al. | 266/81 |
| 5,077,029 | 12/1991 | Schaub | 423/351 |
| 5,122,355 | 6/1992 | Prasad et al. | 423/351 |
| 5,160,380 | 11/1992 | Vocke et al. | 148/206 |

FOREIGN PATENT DOCUMENTS

| | | |
|---|---|---|
| 4556189 | 11/1989 | Australia . |
| 4556289 | 11/1989 | Australia . |
| 2639249 | 11/1988 | France . |
| 2639251 | 11/1988 | France . |

OTHER PUBLICATIONS

Technical Leaflet, BASF-Catalyst R3-11.

*Primary Examiner*—Upendra Roy
*Attorney, Agent, or Firm*—James C. Simmons; William F. Marsh

[57] ABSTRACT

An improved method for producing substantially moisture- and oxygen-free, nitrogen-hydrogen atmospheres suitable for annealing, hardening, brazing, and sintering ferrous and non-ferrous metals and alloys is disclosed. According to the disclosed method, suitable nitrogen-hydrogen atmosphere is produced by 1) generating a nitrogen stream containing about 0.1 to 5% residual oxygen by a known non-cryogenic air separation technique, 2) mixing it with a pre-determined but more than stoichiometric amount of hydrogen required to convert residual oxygen to moisture, 3) converting residual oxygen to moisture by reaction with hydrogen in a catalytic reactor, 4) cooling the reactor effluent stream, and 5) removing moisture from it in a regenerative sorbent dryer.

7 Claims, 3 Drawing Sheets

METHOD OF PRODUCING NITROGEN-HYDROGEN ATMOSPHERES FOR METALS PROCESSING

FIELD OF THE INVENTION

The present invention pertains to preparation of furnace atmospheres with controlled amounts of hydrogen.

BACKGROUND OF THE INVENTION

Inert gases such as nitrogen, argon, helium, and the like are widely employed in industry to protect materials from exposure to oxidizing elements contained in ambient atmosphere. For example, inert gases such as argon, nitrogen, and helium are commonly used today to shield materials during welding, spraying metallic and ceramic materials by thermal and plasma techniques, depositing coatings by chemical vapor and physical vapor deposition techniques, and melting and refining ferrous and non-ferrous metals and alloys. They are also used to provide inert atmosphere for processing composites, semiconductor materials, and chemicals, packaging electronics and food products, removing dissolved gases from chemicals, fruit juices and edible oils, vulcanizing rubber and curing tires, and processing ferrous and non-ferrous metals and alloys, ceramics, composites, and metal matrix. Inert gases used in these applications are required to be substantially free of oxygen and moisture because the presence of these impurities results in oxidizing the processed materials.

Inert gases mixed with more than 0.1% hydrogen are widely employed by the Metals Processing Industry for heat treating operations such as annealing, hardening, brazing, and sintering ferrous and non-ferrous metals and alloys. The primary function of hydrogen gas is to prevent oxidation of metals and alloys during heat treatment as well as to maintain a reducing environment in the furnace. Inert gases used for heat treating metals and alloys are also required to be substantially free of moisture to prevent surface discoloration and/or oxidation during processing.

A major portion of dry, inert nitrogen used by the Metals Processing Industry for heat treating metals and alloys has been produced by distillation of air in large cryogenic plants. The cryogenically produced nitrogen is generally very pure (contains less than 10 ppm by volume residual oxygen) and expensive. To reduce the cost of nitrogen, several non-cryogenic air separation techniques such as pressure swing adsorption and permeation have been recently developed and introduced in the market. The non-cryogenically produced nitrogen is much less expensive, but it contains residual oxygen (0.1 to 5% by volume) which makes a direct substitution of cryogenically produced nitrogen with non-cryogenically produced nitrogen in processing oxygen sensitive materials very difficult.

Several techniques have been developed and used commercially today to purify and produce inert gases substantially free of residual oxygen and other impurities prior to using them in processing oxygen-sensitive materials. For example, Cu/CuO and Ni/NiO based catalysts have been used extensively to purify inert gases by chemically scavenging residual oxygen from them. These catalyst systems are described in detail in BASF Technical Leaflet on BASF-Catalyst R3-11 and U.S. Pat. No. 4,713,224. Since the oxygen absorption capacity of these catalyst systems is limited, they are generally used to purify inert gases containing less than 1,000 ppm or 0.1% by volume oxygen impurity. They are, therefore, not economically attractive for removing residual oxygen from nitrogen streams containing more than 0.1% oxygen impurity. Furthermore, they are not suitable for producing nitrogen-hydrogen atmospheres required for many heat treating applications.

Inert gases containing 0.1% or more of oxygen as an impurity have been purified by converting oxygen to moisture by reaction with hydrogen over platinum group metal catalysts. Such techniques have been disclosed in U.S. Pat. Nos. 5,004,489 and 4,960,579 and in Australian Patent Applications AU 45561/89 and AU 45562/89. The inert gas streams produced by such techniques are contaminated with moisture. They are, therefore, not suitable for producing moisture-free, nitrogen-hydrogen atmospheres required for many heat treating applications.

U.S. Pat. No. 3,535,074 discloses a process for purifying inert gases containing oxygen as an impurity. According to patentees, a pure inert gas stream is produced by converting a part of the oxygen contained in the gas stream to moisture by mixing with hydrogen over a platinum group metal catalyst followed by removing hydrogen, moisture and, remaining oxygen by using a copper or nickel catalyst. The disclosed process, therefore, is not suitable for producing nitrogen-hydrogen atmospheres required for many heat treating applications.

U.S. Pat. Nos. 4,931,070, 5,004,482, 5,077,029, and 5,122,355 and European Patent Application 91109189.0 disclose various processes for producing high purity nitrogen from non-cryogenically generated nitrogen stream. The non-cryogenically generated nitrogen stream containing residual oxygen is purified by mixing it with a controlled amount of hydrogen, converting residual oxygen to moisture over a platinum group metal catalyst, and removing moisture by using a dryer. The amount of hydrogen used in these processes is controlled very precisely to produce high purity nitrogen containing less than 0.1% or 1,000 ppm hydrogen impurity. These processes do not, therefore, disclose producing nitrogen-hydrogen atmospheres with more than 0.10% hydrogen required for many heat treating applications.

French Patent Applications (Publication numbers 2,639,249 and 2,639,251) disclose processes for producing nitrogen-hydrogen atmospheres from non-cryogenically generated nitrogen. In these processes non-cryogenically generated nitrogen containing residual oxygen is mixed with hydrogen and reacted over a platinum group metal catalyst to convert residual oxygen to moisture. The moisture is subsequently removed using a refrigeration dryer, producing nitrogen-hydrogen stream containing more than 350 ppm moisture. The processes disclosed in these patent applications are, therefore, not suitable for producing substantially moisture-free, nitrogen-hydrogen atmospheres required for many heat treating applications.

SUMMARY OF THE INVENTION

This invention is an improved and economical process for producing moisture- and oxygen-free, nitrogen-hydrogen atmospheres suitable for many heat treating related applications. According to this invention, a suitable nitrogen-hydrogen atmosphere is produced by 1) generating an impure nitrogen stream containing about 0.1 to 5% residual oxygen by a known non-cryogenic air separation technique, 2) mixing the impure nitrogen stream with a pre-determined amount of hydrogen, 3) converting residual oxygen to moisture by reaction with hydrogen in a catalytic reactor, 4) cooling the reactor effluent stream, and 5) removing moisture from it in a regenerative sorbent dryer. The nitrogen-hydrogen atmosphere containing less than 100ppm moisture and 10 ppm residual oxygen and more than 0.1% hydrogen can be used for annealing, hardening, brazing, and sintering ferrous and non-ferrous metals and alloys in a single furnace or multiple furnaces without requiring any additional downstream gas blending equipment.

DETAILED DESCRIPTION OF THE INVENTION

A major portion of nitrogen used in heat treating applications has been produced by distillation of air in large cryogenic plants. The cryogenically produced nitrogen is generally very pure (contains less than 10 ppm by volume residual oxygen) and expensive. To reduce the cost of nitrogen, several non-cryogenic air separation techniques such as adsorption and permeation have been recently developed and introduced in the market. The non-cryogenically produced nitrogen is indeed cheap but it contains a considerably higher level of residual oxygen about (0.1 to 5% by volume) than that produced cryogenically, making a direct substitution of cryogenically produced nitrogen with non-cryogenically produced nitrogen in processing oxygen sensitive materials very difficult. Therefore, there has been a great demand by the heat treating industry to produce moisture- and oxygen-free, nitrogen-based atmospheres inexpensively.

Several processes have been developed and used today to purify inert gases such as helium, argon, nitrogen, etc. These processes utilize either chemical agents that absorb oxygen or reducing agents that react with oxygen. Chemical agents such as Cu and Ni are very effective to absorb oxygen, but they have limited capacity. They require frequent regeneration at high temperature with hydrogen, making them cost prohibitive. Reducing agents such as hydrogen and methanol are quite effective in converting oxygen to moisture or a mixture of carbon dioxide and moisture. They have been successfully employed today to purify inert gases. However, they have not been employed to produce nitrogen-hydrogen atmospheres required for many heat treating applications. Therefore, there is a need to develop a process to produce low-cost, nitrogen-hydrogen atmospheres containing less than 100 ppm moisture and 10 ppm residual oxygen and more than 0.1% hydrogen for many heat treating applications.

According to the present invention, low-cost, substantially moisture-and oxygen-free, nitrogen-hydrogen atmosphere containing more than 0.1% hydrogen suitable for many heat treating applications is produced by 1) generating an impure nitrogen stream containing about 0.1 to 5% residual oxygen by a known non-cryogenic air separation technique, 2) mixing the impure nitrogen stream with a pre-determined amount of hydrogen, 3) converting residual oxygen to moisture by reaction with hydrogen in a catalytic reactor, 4) cooling the reactor effluent stream, and 5) removing moisture from it in a regenerative sorbent dryer.

The residual oxygen present in non-cryogenically generated feed nitrogen stream of the present invention can vary from about 0.1% to about 5%. It can preferably vary from about 0.1% to about 2%. More preferably, it can vary from about 0.1% to about 1.0%.

Figure 1:
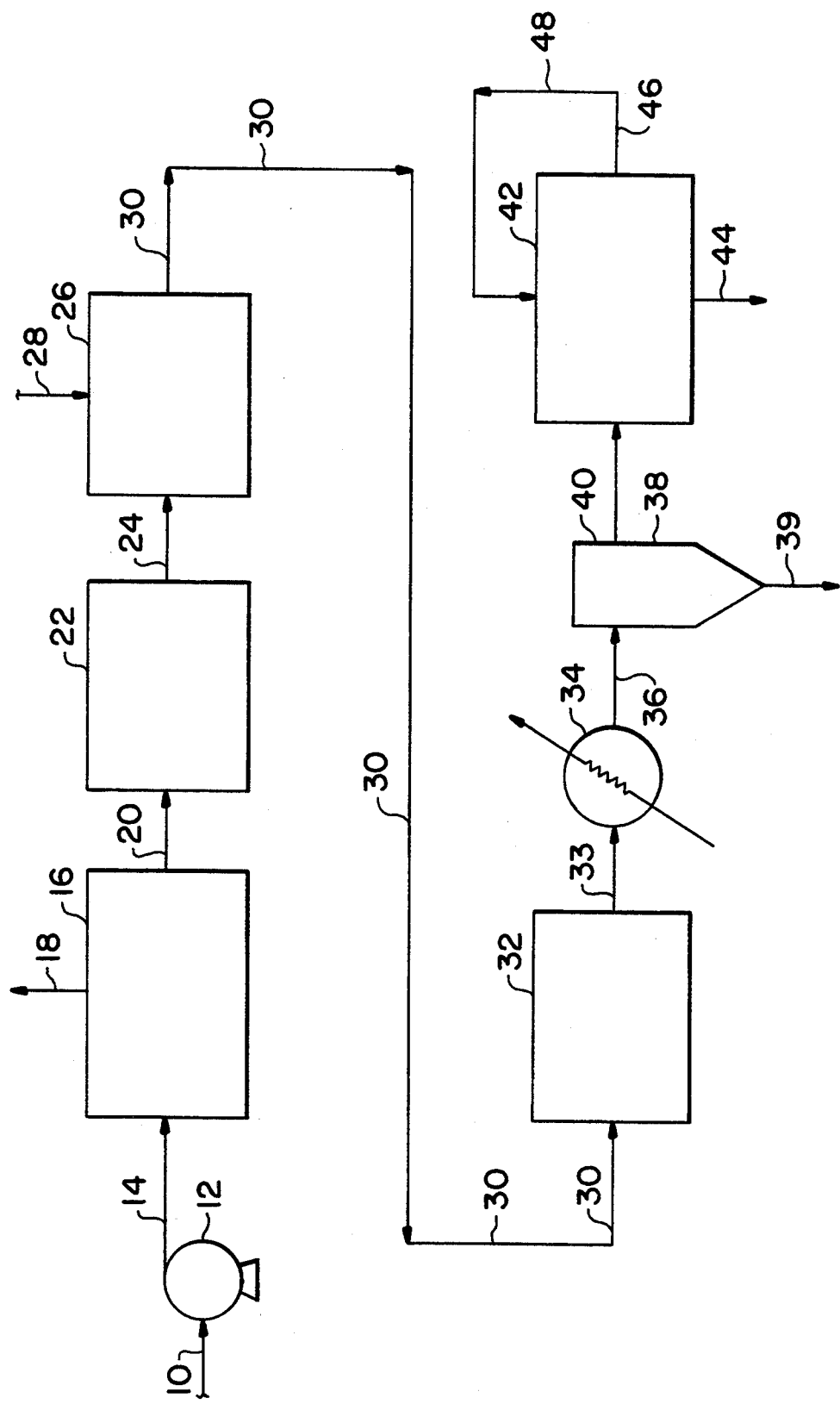
FIG. 1 is a flow diagram illustrating the process of the present invention.

Referring to FIG. 1, the process according to the present invention is shown schematically in the form of a flow diagram. In the diagram according to FIG. 1 ambient air, shown by arrow 10, is compressed to an elevated pressure in compressor 12 and conducted via conduit 14 to a non-cryogenic air separation device 16. Separation of the air into an oxygen-rich stream shown as 18 which can be vented to the atmosphere and a nitrogen-rich stream shown as 20 takes place in the separator 16. The non-cryogenic nitrogen can be conducted via conduit 20 to a nitrogen storage tank 22 and then conducted via conduit 24 to a nitrogen-hydrogen blender 26 where a specific amount of hydrogen, as will hereinafter be explained, is blended with the non-cryogenic nitrogen stream to subsequently effect conversion of all of the residual oxygen in the nitrogen stream and to add sufficient hydrogen to have the required hydrogen-nitrogen blend for introduction into a treating furnace. The non-cryogenic nitrogen/hydrogen mixture is conducted via conduit 30 to a catalytic reactor 32 wherein the residual oxygen is converted to moisture with the resultant or effluent stream in conduit 33 being a stream of nitrogen with hydrogen and moisture or water vapor. The stream exiting catalytic reactor 32 via conduit 33 is cooled in a heat exchanger 34 and then passed via conduit 36 to a phase separator 38 where the condensed moisture is removed via drain 39. From phase separator 40 the stream can be passed through a regenerative sorbent dryer 42 where the final moisture is removed and the nitrogen/hydrogen blend can be conducted via conduit 46 to a point of use. A portion of the nitrogen/hydrogen blend exiting the sorbent dryer can be recycled via conduit 48 to regenerate the dryer.

The feed non-cryogenically generated nitrogen stream 24 is blended with a pre-determined amount of hydrogen required for converting residual oxygen to moisture as well as to the desired nitrogen-hydrogen blend required for maintaining a reducing environment in the furnace. Specifically, the amount of hydrogen added to the feed non-cryogenically generated nitrogen is adjusted according to the following formula:

Total hydrogen added=Stoichiometric amount of hydrogen required to convert residual oxygen to moisture+Amount of hydrogen required to maintain a reducing environment in the furnace (generally more than 0.1% hydrogen)

Figure 2:
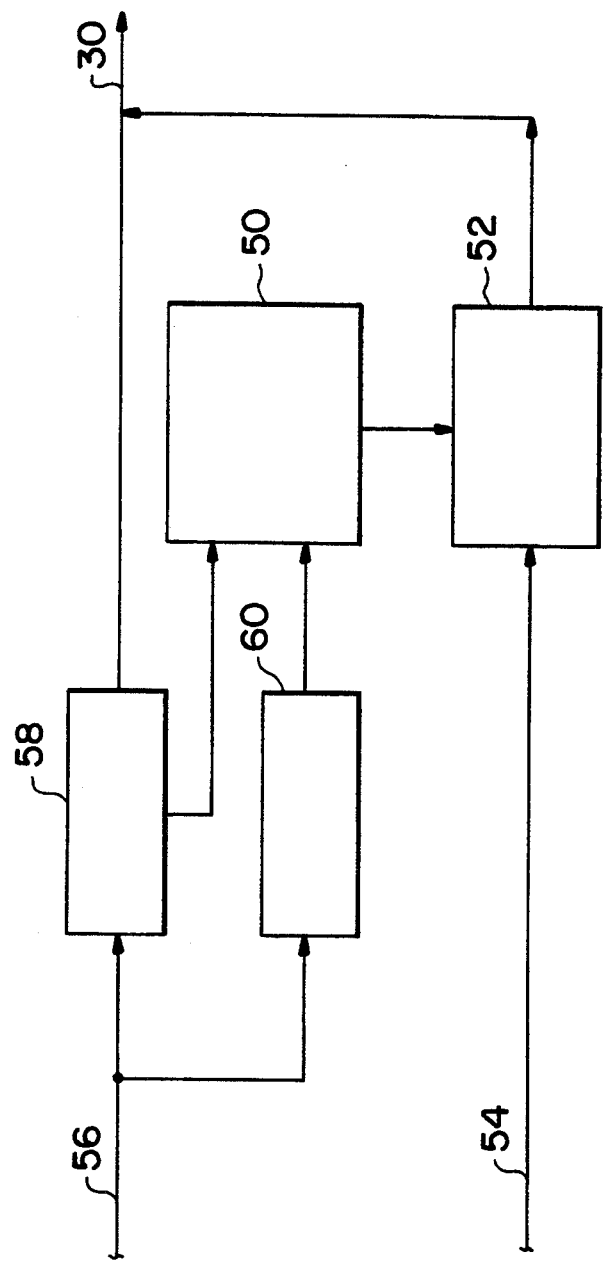
FIG. 2 is a schematic flow diagram illustrating introduction of a nitrogen-hydrogen mixture into a catalytic reactor according to the invention.
Figure 3:
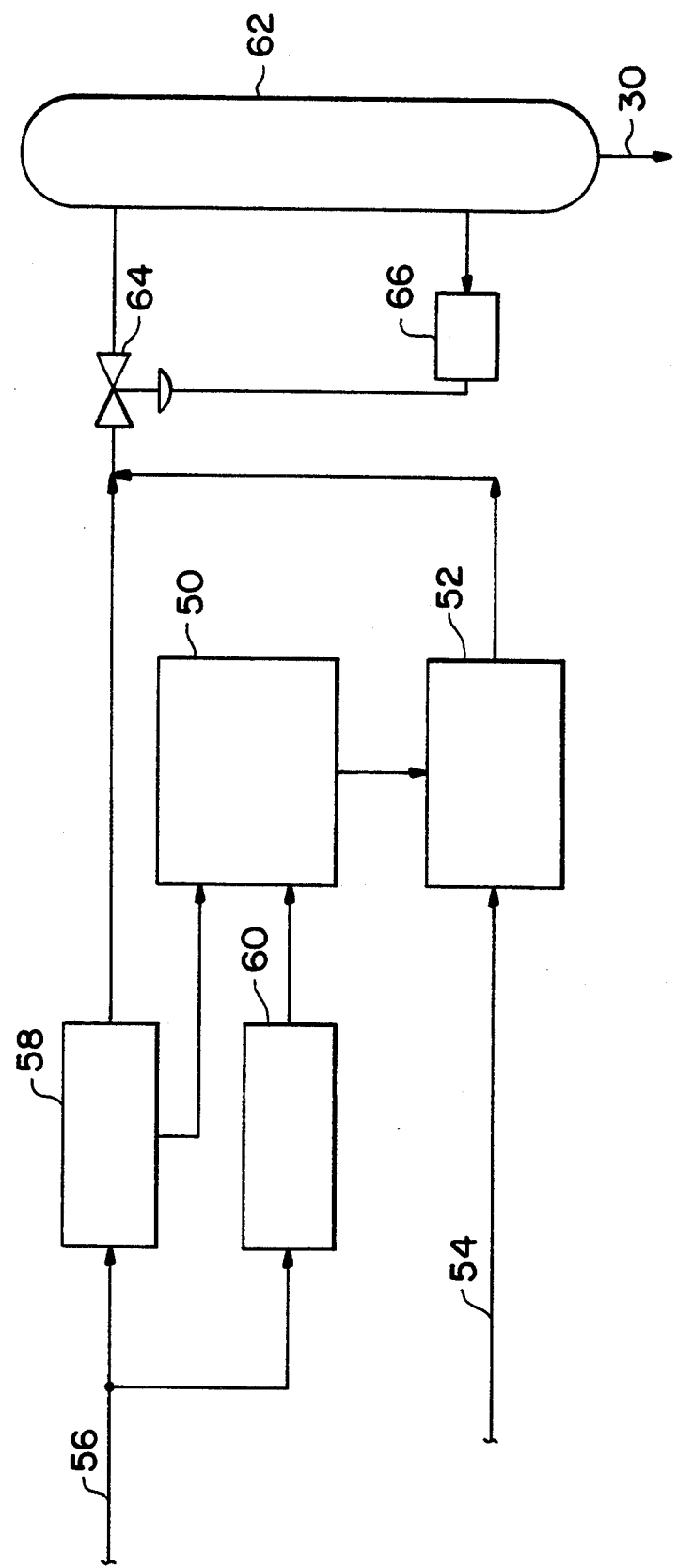
FIG. 3 is a schematic flow diagram of an alternate embodiment of the system of FIG. 2.

As shown in FIG. 2, a microprocessor or a control scheme 50 operating a flow controller 52 downstream of a hydrogen source 54 is used to regulate the flow of hydrogen added to non-cryogenically generated nitrogen stream 56. Microprocessor or control scheme 50 receives input signals from flow sensor 58 and oxygen analyzer 60 to determine and adjust the stoichiometric amount of hydrogen required for converting residual oxygen contained in the non-cryogenically generated nitrogen stream 56 to moisture. The microprocessor or control scheme is also used to control the flow of hydrogen to obtain more than 0.1% hydrogen or the amount of hydrogen required to maintain a reducing environment in the furnace in the nitrogen-hydrogen blend. This nitrogen-hydrogen blend can be fed directly to the catalytic reactor via conduit 30. The direct flow of blended gas to the reactor is capable of providing a 12 to 1 turn down capability. A surge tank blender 62 along with a pressure control valve 64 connected to a pressure sensor 66 shown in FIG. 3 can optionally be used to feed the blended nitrogen-hydrogen mixture 30 to the catalytic reactor 32 and to provide an infinite turn down capability. The amount of hydrogen in the substantially moisture- and oxygen-free, nitrogen-hydrogen blend can be varied from above about 0.1% to about 30%, preferably from about 0.25% to about 15% with the help of microprocessor or a control scheme 50. The hydrogen can be supplied in the gaseous form from high pressure gaseous tanks or by vaporizing liquid hydrogen. It can alternatively be produced on-site by dissociating ammonia or reforming a hydrocarbon gas.

In some instances, it may be preferable to treat non-cryogenically generated nitrogen with the minimum amount of hydrogen to produce a substantially oxygen- and moisture-free nitrogen-hydrogen stream. This stream is then mixed with an additional amount of hydrogen to produce the nitrogen-hydrogen product stream containing the desired level of hydrogen required for metals processing.

In other instances, it may be preferable to add other gases to product nitrogen-hydrogen mixtures to produce the desired atmosphere for heat treatment. For example, it may be preferable to add an enriching gas such as methane, ethane, propane or natural gas to nitrogen-hydrogen mixtures to help in regulating carbon potential of the atmospheres.

The catalytic reactor 32 (FIG. 1) used for converting residual oxygen to moisture with hydrogen is packed with a precious metal catalyst supported on a high surface area support material made of alumina, magnesia, zirconia, silica, titania, or mixtures thereof. The precious metal catalyst can be selected from platinum group metals such as platinum, palladium, rhodium, ruthenium, iridium, osmium, or mixtures thereof. The metal concentration in the catalyst can vary from about 0.05 to about 1.0% by weight. Preferably, the metal concentration is between 0.1 to 0.5% by weight. Metal catalyst selected from palladium, platinum, or mixtures thereof supported on a high surface area alumina is more preferable. Metal catalyst can be shaped in the form of pellets or balls. Commercially available palladium and platinum metal based catalysts such as Type 30196-29 supplied by GPT, Inc., Manalapan, N.J., R0-20, R0-21, and R0-22 supplied by BASF Corporation, Parsippany, N.J., and Type 48, 50, 50A, 50B, 54, and 73 supplied by Johnson Matthey, Wayne, Pa. can also be used for reacting residual oxygen with hydrogen.

The precious metal catalyst can optionally be supported on a metallic or a ceramic honeycomb structure. Once again the precious metal supported on these structures can be selected from platinum group metals such as platinum, palladium, rhodium, ruthenium, iridium, osmium, or mixtures thereof. The metal concentration in the catalyst can vary from about 0.05 to about 1.0% by weight. Preferably, the metal concentration is between 0.1 to 0.5% by weight. Metal catalyst selected from palladium, platinum, or mixtures thereof supported on a honeycomb structure is more preferable. The honeycomb structure can be similar to the one described in a technical brochure "VOC destruction through catalytic incineration" published by Johnson Matthey, Wayne, Pa. It can also be similar to the ones described in technical brochures "High Performance Catalytic Converters With Metal Cores" published by Camet Co., Hiram, Ohio and "Celcor (registered trade mark of Corning) Honeycomb Catalysts Support" published by Corning, N.Y.

The hourly flow rate of gaseous mixture flowing through the catalytic reactor can vary from about 100 to 40,000 times the volume of the reactor. It can preferably vary from about 1,000 to 20,000 times the volume of the reactor. More preferably, it can vary from about 2,000 to 10,000 times the volume of the reactor.

The effluent gas from the catalytic reactor containing nitrogen, less than 10 ppm oxygen, moisture, and hydrogen is cooled in a heat exchanger and passed through a phase separator to remove any condensed phase, as shown in FIG. 1. The cooled gas stream is then passed through a sorbent dryer containing at least two beds of alumina, molecular sieve, or zeolite sorbent or a combination thereof to remove moisture. The sorbent is periodically regenerated by passing a purge stream through the bed at either elevated temperature (thermal regeneration or temperature swing regeneration) or reduced pressure (pressure swing regeneration). A portion of the nitrogen/hydrogen blend exiting the sorbent dryer can be used as a purge stream to regenerate the dryer. In order to improve both the recovery of product nitrogen-hydrogen blend and the process economics, a non-cryogenically generated nitrogen stream followed by a nitrogen-hydrogen blend can be used for purging and regenerating sorbent bed.

The following examples further illustrate the present invention.

EXAMPLE 1

An impure nitrogen stream containing 99.8 nitrogen and 0.2% residual oxygen was produced by using a pressure swing adsorption (PSA) unit. Approximately 7,100 SCFH of this impure nitrogen stream is blended with 0.4% hydrogen. This amount of hydrogen was equal to the stoichiometric amount of hydrogen required to convert residual oxygen to moisture. The impure nitrogen stream was blended with 0.75% additional amount of hydrogen to provide a substantially moisture- and oxygen-free product nitrogen-hydrogen blend with close to 0.75% hydrogen. The blend of impure nitrogen and hydrogen was passed through a catalytic reactor to convert residual oxygen to moisture. The reactor was packed with 0.5% palladium metal catalyst supported on ⅛" diameter alumina pellets supplied by Johnson Matthey of Wayne, Pa. The flow rate of blend feed gas used in this example provided a gas hourly space velocity (GHSV) of close to 5,800 cubic feet of gas per hour per cubic feet of catalyst volume or 5,800 1/hr. The gaseous feed mixture was at ambient temperature and the reactor was not heated from an external heating source. The reactor effluent was cooled close to 80° F. by passing it through a water cooled heat exchanger. The moisture produced by reacting residual oxygen with hydrogen was removed from the effluent stream by using a temperature swing regenerative dryer packed with alumina and molecular sieve. The effluent stream from the dryer contained less than 5 ppm oxygen, less than 10 ppm moisture (or less than −70° F. dew point), and approximately 0.75% hydrogen. Thus, the effluent nitrogen-hydrogen stream was substantially free of oxygen and moisture and contained the desired 0.75% hydrogen.

A part of this purified nitrogen-hydrogen blend was mixed with an additional amount of hydrogen to bring the total hydrogen level in the blended stream close to 3.754. It was then used for sintering powder metal parts in a furnace operated at approximately 1,120° C. temperature. The powder metal parts were made of Fe—C and Fe—Cu—C powders containing 0.9% carbon, 0.75% zinc stearate, and balance iron and 2.0% copper, 0.9% carbon, 0.75% zinc stearate, and balance iron. The Fe—C and Fe—Cu—C powder metal parts sintered in this example were bright and free of surface oxides.

This example showed that an oxygen- and moisture-free nitrogen-hydrogen blend containing more than 0.10% hydrogen can be produced from non-cryogenically generated nitrogen and used for sintering powder metal parts.

EXAMPLE 2

The purification followed by powder metal sintering steps described in Example 1 were repeated using similar composition and flow rate of non-cryogenically generated nitrogen. The impure nitrogen stream is blended with 0.4% hydrogen. This amount of hydrogen was equal to the stoichiometric amount of hydrogen required to convert residual oxygen to moisture. The impure nitrogen stream was blended further with 3.75% additional amount of hydrogen to provide a substantially moisture- and oxygen-free product nitrogen-hydrogen blend with close to 3.75% hydrogen. The blend of impure nitrogen and hydrogen was purified using the catalytic reactor, water cooled heat exchanger, and regenerative dryer similar to ones described in Example 1. The purified stream or effluent stream from the dryer contained less than 5 ppm oxygen, less than 10 ppm moisture (or less than −70° F. dew point), and approximately 3.75% hydrogen. It was therefore substantially free of oxygen and moisture and contained the desired 3.75% hydrogen.

A part of this purified nitrogen-hydrogen blend was used for sintering powder metal parts similar to those described in Example 1 in a furnace operated at approximately 1,120° C. temperature. The powder metal parts sintered in this example were bright and free of surface oxides.

This example also showed that a substantially oxygen- and moisture-free nitrogen-hydrogen blend containing more than 0.10% hydrogen can be produced from non-cryogenically generated nitrogen and used for sintering powder metal parts.

What is desired to be secured by Letters Patent of the United States is set out in the appended claims.

1. A process of generating a gas mixture having a fixed amount of hydrogen mixed with nitrogen for injecting into a single heat treating furnace or multiple heat treating furnaces comprising the steps of:
   mixing non-cryogenically produced nitrogen gas containing up to five percent by volume oxygen with hydrogen, said hydrogen being present in an amount equal to that required to convert residual oxygen in the nitrogen to moisture plus an amount to result in more than 0.1 percent by volume hydrogen in the final gas mixture;
   passing said non-cryogenically produced nitrogen and hydrogen through a catalytic reactor for conversion of said oxygen to moisture resulting in a mixture of nitrogen, hydrogen and moisture;
   removing moisture from said mixture of nitrogen, hydrogen and moisture by passing said mixture of nitrogen, hydrogen and moisture through a phase separator followed by a regenerative sorbent dryer; and
   injecting said nitrogen-hydrogen mixture into said heat treating furnace.

2. A process according to claim 1 including the steps of using a portion of the nitrogen-hydrogen mixture exiting said sorbent dryer to regenerate said sorbent dryer.

3. A process according to claim 1 wherein said mixture of non-cryogenic produced nitrogen and hydrogen is passed through a catalytic reactor packed with precious metal catalyst supporter on a high surface area support.

4. A process according to claim 1 wherein said mixture of nitrogen, hydrogen and moisture is cooled after passing through said catalytic reactor and prior to removing said moisture.

5. A process according to claim 1 wherein an enriching gas selected from the group consisting of methane, ethane, propane, or natural gas is added to the product nitrogen-hydrogen mixture prior to injecting the said nitrogen-hydrogen mixture into said heat treating furnace or furnaces.

6. A process according to claim 1 wherein less than 350 ppm moisture is maintained in the nitrogen-hydrogen mixture injected into said heat treating furnace.

7. A process according to claim 1 wherein said mixture of nitrogen, hydrogen and moisture is passed through a regenerative sorbent dryer of the temperature swing regeneration type.

* * * * *